S. C. TAYLOR.
Assignor to H. D. JUSTI.
Dental Instruments.
No. 8,795. Reissued July 8, 1879.
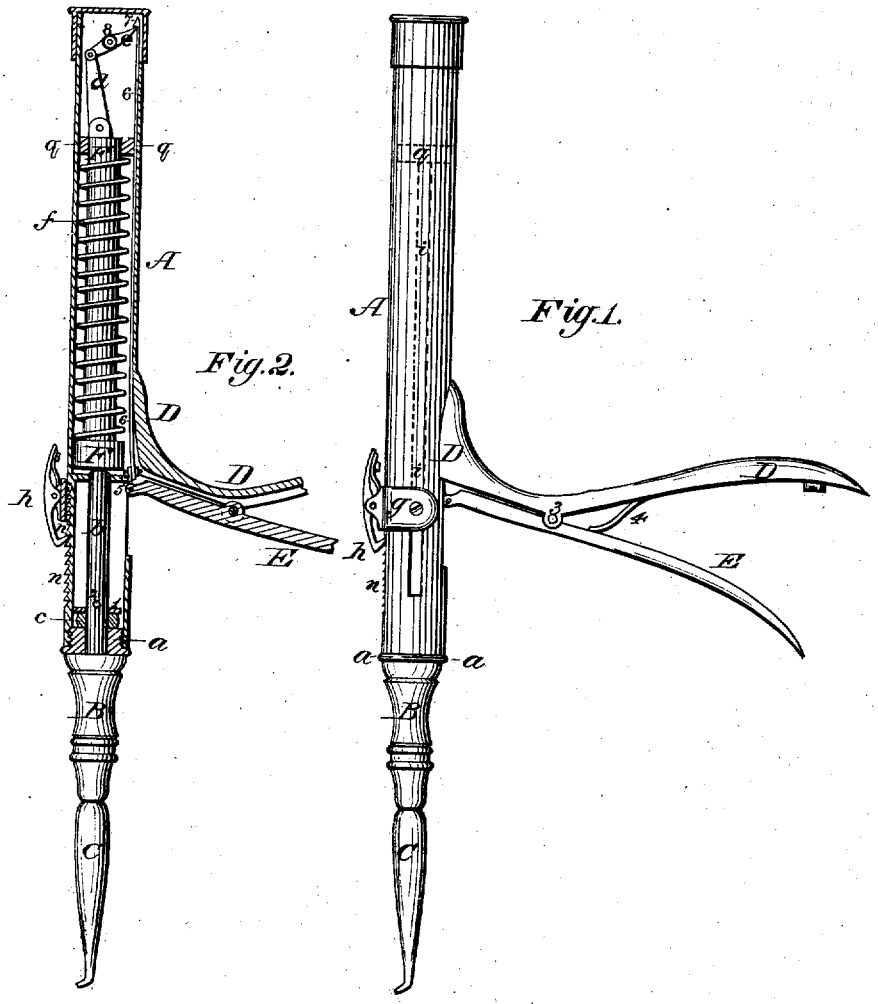
Witnesses:
Donn P. Turtchell
William M. Dodge
Inventor:
S. C. Taylor.
Assignor to H. D. Justi
By Dodger & Son
Attys.
N. PETERS, PHOTO-LITHOGRAPHER, WASHINGTON, D. C.

UNITED STATES PATENT OFFICE.

SAMUEL C. TAYLOR, OF TOLEDO, OHIO, ASSIGNOR TO HENRY D. JUSTI.

IMPROVEMENT IN DENTAL INSTRUMENTS.

Specification forming part of Letters Patent No. 74,629, dated February 18, 1868; Reissue No. 8,795, dated July 8, 1879; application filed May 23, 1879.

*To all whom it may concern:*

Be it known that I, SAMUEL C. TAYLOR, of Toledo, in the county of Lucas and State of Ohio, have invented certain new and useful Improvements in Dental Instruments; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists, first, in combining with an upright mallet, which may operate by its own gravity or be accelerated by a spring, a permanent and pivoted lever, so that the operator with one and the same hand may raise the mallet and let it fall, and steadily hold the instrument and operate it.

My invention further consists in combining with a pivoted lever a rod and hook, for catching upon the toe-piece or crotchet and raising up the mallet, and then tripping it to let the mallet fall, as will be explained.

My invention further consists in a ready means of increasing the power of the spring upon the mallet, or diminishing it at pleasure, or removing it entirely, as the condition of the work to be done may require.

My invention further consists in providing the body or case of a dental tool which is intended to be used in one hand with a side arm or projection, to receive the hand of the operator and form a means of holding and manipulating the same.

Figure 1 represents an external view of the instrument, and Fig. 2 represents a vertical central section through the same.

A is an external case or hollow tube for containing much of the mechanism of the instrument. To the lower end of the case there is screwed a nut, *a*, to which the socket B is united by having its shank *b* to pass through the nut, through a rubber or other spring, *c*, and held therein by a washer, 1, and pin 2, so that the socket can be freely turned around or in the case, but at the same time held thereto by a spring attachment, for a purpose to be hereinafter explained.

In the socket B the plugging-tool C, of any known kind, is placed, removed, replaced, or exchanged for others, as may be required. On the case is permanently secured a projecting lever or handle, D, by which the instrument is mainly held by the operator.

It will be noted that this handle is located about midway of the length of the instrument, and that it extends out laterally, and is rounded on the upper side to fit the hand of the operator, the arrangement being such that the upper end of the body will extend upward, when the instrument is grasped, past the side or back of the hand.

It will also be noted, on reference to the drawing, that the location of the side arm is such that the operator can, while grasping the arm, reach the tool or tool-socket with his index-finger and thumb, and impart to them, if required, a rotary motion.

To the under side of the handle D there is pivoted, as at 3, a vibrating lever, E, the free end of which is grasped in the hand that holds the lever D to raise up the mallet, and the spring 4 between the levers restores the hinged one, E, to the position shown in Fig. 1, when the grasp of the hand or pressure of the fingers upon it is removed or relaxed. To that end of the lever E which projects into the case A there is connected by a link, 5, a rod, 6, which extends upward to near the top of the case, and its extreme upper end is furnished with a hook, 7, which catches over the crotchet or toe-piece *e* to draw down one of its ends, it being pivoted at 8, which, drawing down correspondingly, raises up its other end, to which the plunger or mallet F is connected by a link, *d*.

As the mallet F is raised up, it, under some circumstances, compresses the coiled spring *f* around it, so that when the hook 7 slips off from the crotchet or toe-piece, as it will do after drawing it down below its center of motion, the reaction of the spring brings down the mallet with an increased force over that of its own gravity; and that the blow of the mallet F upon the shank *b* of the socket may be noiseless, or comparatively so, I insert a piece of hard wood, or equivalent hard non-conducting material, in the end of the mallet which strikes upon the shank B.

The instrument is so arranged that the mallet may fall with its gravity only upon the shank-socket or plugging-tool, and thus give a very delicate blow; or the recoil of the spring may be connected with the mallet, so as to graduate the blow, as follows: Upon the exterior of the case A there is a clasp, *g*, to which is pivoted a spring-dog, *h*, to which clasp are attached rods *i*, (one only being seen in dotted lines in Fig. 1, but both alike, and one on each side,) that extend upward, and are fastened to a cap or button, 9; and on the case A there are teeth *n*, upon which the dog or catch *h* will take and hold.

By sliding the clasp downward the spring is compressed and made stronger, and by sliding it upward the spring is relaxed, and its recoil and consequent throw of the mallet less violent, so that the blow may be regulated anywhere between the gravity of the mallet alone and the extreme of the power of the spring.

The blow, it will be perceived, is not transmitted through the case or body of the instrument, which would cause a jar and unsteadiness of the instrument in the hands of the operator, but is transmitted through the shank *b* and spring-cushion *c* to the plugging-tool C without moving or jarring the body of the instrument.

The turning of the shank is important, as it allows the curved end of the tool to work under any portion of the cavity that is being plugged.

I am aware that a dental plugger has been provided at the top with a side arm to receive a mallet-arm pivoted upon its upper side, the arm being neither intended nor adapted to receive the pressure of the hand.

My invention consists not merely in a side arm, but in an arm so constructed and arranged as to receive the pressure of the operator's hand while the instrument is grasped within and guided by his fingers.

What I claim as my invention, and desire to secure by Letters Patent, is—

1. In combination with the mallet and the trip movement, a permanent side arm or lever and an adjacent pivoted lever connected with the trip movement, and adapted to be operated by hand, as described, so that the user may hold the instrument, and, by means of the pivoted lever, actuate the mallet with one and the same hand.

2. In combination with the pivoted hand-lever on the side of the instrument, the mallet connected with the toe-piece or crotchet, and the rod and hook connected with the hand-lever, and arranged to engage upon, draw down, and release the toe-piece, as shown.

3. In combination with the mallet and a spring in a plugging-instrument, the sliding dog or catch and the teeth, for the purpose of compressing, graduating, or regulating the action of the spring upon the mallet without changing the extent of motion of the lever E, substantially as described.

4. In a dental instrument to be actuated by one hand, the combination of a body or tube and an arm or hand-piece extending from its side near the middle or lower end, as described and shown, whereby the arm is adapted to rest within the hand of the operator while the instrument is being held and guided by his fingers.

5. In an instrument for use by one hand, the combination of a body, A, a side arm, D, thereon, substantially as shown, in position to receive the pressure of the operator's hand while the tool or instrument is grasped between his fingers, and a tool having a swivel-connection with the body, as shown.

SAMUEL C. TAYLOR.

Witnesses:
G. E. POMEROY, Jr.,
G. W. KELLEY.